(12) United States Patent
Takahashi et al.

(10) Patent No.: US 12,590,913 B2
(45) Date of Patent: Mar. 31, 2026

(54) SCINTILLATOR AND CHARGED PARTICLE RADIATION APPARATUS

(71) Applicant: Hitachi High-Tech Corporation, Tokyo (JP)

(72) Inventors: Eri Takahashi, Tokyo (JP); Shin Imamura, Tokyo (JP); Makoto Suzuki, Tokyo (JP); Shunsuke Mizutani, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 609 days.

(21) Appl. No.: 17/923,662

(22) PCT Filed: Jun. 10, 2020

(86) PCT No.: PCT/JP2020/022775
§ 371 (c)(1),
(2) Date: Nov. 7, 2022

(87) PCT Pub. No.: WO2021/250799
PCT Pub. Date: Dec. 16, 2021

(65) Prior Publication Data
US 2023/0184704 A1 Jun. 15, 2023

(51) Int. Cl.
*G01N 23/2251* (2018.01)
*G01T 1/20* (2006.01)

(52) U.S. Cl.
CPC ....... *G01N 23/2251* (2013.01); *G01T 1/2018* (2013.01); *G01N 2223/07* (2013.01); *G01N 2223/20* (2013.01); *G01N 2223/505* (2013.01)

(58) Field of Classification Search
CPC ....... G01T 1/20; G01T 1/2002; G01T 1/2018; H01J 37/244; H01J 2237/28;
(Continued)

(56) References Cited

U.S. PATENT DOCUMENTS

2006/0263638 A1 11/2006 Kawakami et al.
2016/0155526 A1* 6/2016 Arimoto .............. C09K 11/628
250/488.1
(Continued)

FOREIGN PATENT DOCUMENTS

JP 2012-235154 A 11/2012
JP 2017-120192 A 7/2017
(Continued)

OTHER PUBLICATIONS

International Search Report of PCT/JP2020/022775 dated Sep. 1, 2020.

*Primary Examiner* — David E Smith
*Assistant Examiner* — Hsien C Tsai
(74) *Attorney, Agent, or Firm* — MATTINGLY & MALUR, PC

(57) ABSTRACT

The present invention provides: a scintillator which is reduced in the intensity of the afterglow, while having increased luminous intensity; and a charged particle radiation apparatus. A scintillator according to the present invention is characterized in that: a base material, a buffer layer, a light emitting part and a first conductive layer are sequentially stacked in this order; the light emitting part contains one or more elements that are selected from the group consisting of Ga, Zn, In, Al, Cd, Mg, Ca and Sr; and a second conductive layer is provided between the base material and the light emitting part.

15 Claims, 5 Drawing Sheets

(58) Field of Classification Search
CPC ..... H01J 2237/24475; H01J 2237/2443; H01J
2237/2448
See application file for complete search history.

(56) References Cited

U.S. PATENT DOCUMENTS

| 2018/0059268 | A1  |  3/2018 | Hospodková et al. |
| 2019/0023982 | A1* |  1/2019 | Fujita ................... G01T 1/2002 |
| 2019/0355549 | A1  | 11/2019 | Imamura et al. |

FOREIGN PATENT DOCUMENTS

| JP | 2018-513351 | A  |  5/2018 |
| JP | 2018-124100 | A  |  8/2018 |
| JP | 2018-163828 | A  | 10/2018 |
| WO | 2014/128957 | A1 |  8/2014 |
| WO | 2015/002281 | A  |  1/2015 |
| WO | 2017/115638 | A1 |  7/2017 |

* cited by examiner

SCINTILLATOR AND CHARGED PARTICLE RADIATION APPARATUS

TECHNICAL FIELD

The present invention relates to a scintillator and a charged particle beam apparatus.

BACKGROUND ART

A charged particle beam apparatus that detects charged particles obtained by irradiating a sample with a charged particle beam such as an electron beam is provided with a detector for detecting the charged particles. For example, when electrons emitted from a sample are detected by scanning the sample with an electron beam, the electrons are guided to a scintillator of the detector by applying a positive voltage of about 8 to 10 kV called a post voltage to an electron detector. Alternatively, a method is also conceivable in which a detector is provided on the trajectory of electrons, and the electrons are made incident on the scintillator without applying a post voltage. Light generated by the scintillator due to collision of electrons is guided to a light guide, converted into an electric signal by a photodetector such as a photoelectric tube, and becomes an image signal or a waveform signal.

Patent Literature 1 discloses a scintillator including a luminescent layer that is made of ZnO doped with impurities and generates scintillation light in response to incidence of radiation.

CITATION LIST

Patent Literature

PTL 1: JP 2017-120192 A

SUMMARY OF INVENTION

Technical Problem

The scintillator is required to improve detection efficiency by reducing afterglow intensity and increasing luminescence intensity. The scintillator emits light due to recombination of carriers excited in the scintillator, but when the residual carriers emit light with a delay, afterglow is caused, and in a case where the luminescent unit has a structure with a low probability of carrier recombination, the luminescence intensity is low.

In PTL 1 disclosed above, a scintillator having a short fluorescence lifetime and high luminous efficiency is obtained by using a material having high-speed response characteristics and further adjusting the electron concentration of the luminescent layer. However, reduction of afterglow due to residual carriers and an increase in luminescence intensity due to improvement of the luminescent unit structure are not considered.

In view of the above circumstances, an object of the present invention is to provide a scintillator and a charged particle beam apparatus that achieve both a decrease in afterglow intensity and an increase in luminescence intensity by reducing the afterglow intensity and improving the structure of a luminescent unit.

Solution to Problem

According to one aspect of the present invention for achieving the above object, a scintillator includes a substrate, a buffer layer, a luminescent unit, and a first conductive layer stacked in this order, in which the luminescent unit contains one or more elements that are selected from the group consisting of Ga, Zn, In, Al, Cd, Mg, Ca and Sr, and a second conductive layer is provided between the substrate and the luminescent unit.

In addition, according to one aspect of the present invention for achieving the above object, a charged particle beam apparatus includes an electron source that irradiates an analyte with an electron beam; and a secondary particle detector that detects secondary particles emitted when the analyte is irradiated with the electron beam, in which the secondary particle detector includes the above-described scintillator of the present invention.

A more specific configuration of the present invention is described in the claims.

Advantageous Effects of Invention

According to the present invention, it is possible to provide a scintillator and a charged particle beam apparatus that achieve both a decrease in afterglow intensity and an increase in luminescence intensity by reducing the afterglow intensity and improving the structure of a luminescent unit.

Problems, configurations, and effects other than those described above will be clarified by the following description of embodiments.

DESCRIPTION OF EMBODIMENTS

[Charged Particle Beam Apparatus]

Hereinafter, a charged particle beam apparatus provided with a detector using a scintillator as a detection element will be described. Hereinafter, an example of an electron microscope, particularly a scanning electron microscope (SEM) will be described as the charged particle beam apparatus.

Figure 1:
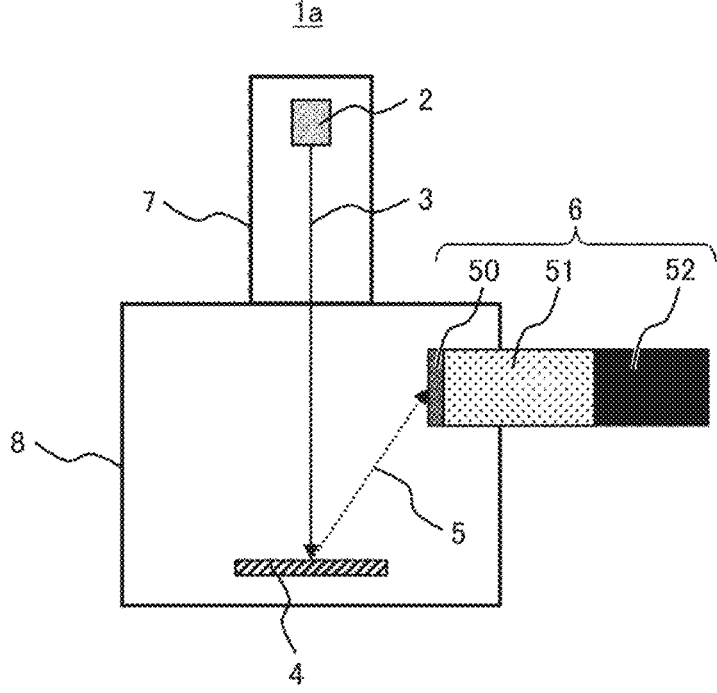
FIG. 1 is a schematic sectional view illustrating a first example of a charged particle beam apparatus of the present invention.

First, a configuration of the charged particle beam apparatus on which a detector is mounted will be described. FIG. 1 is a schematic sectional view illustrating a first example of the charged particle beam apparatus of the present invention. As illustrated in FIG. 1, a charged particle beam apparatus (electron microscope) 1a includes an analyte (sample) 4, an electron source 2 that irradiates the sample 4 with an electron beam (primary electron beam) 3, and a detector 6 that detects charged particles (secondary particles) 5 emitted from the sample 4 irradiated with the electron beam 3. The electron source 2 is accommodated in an electron optical lens barrel 7, and a sample 4 is accommodated in the sample chamber 8.

The detector 6 includes a scintillator 50, a light guide 51, and a photodetector 52. The secondary particles 5 are drawn into the scintillator 50 of the detector 6 by applying a post voltage, and luminescence occurs in the scintillator 50. The luminescence from the scintillator 50 is guided by the light guide 51 and converted into an electric signal by the photodetector 52.

Figure 2:
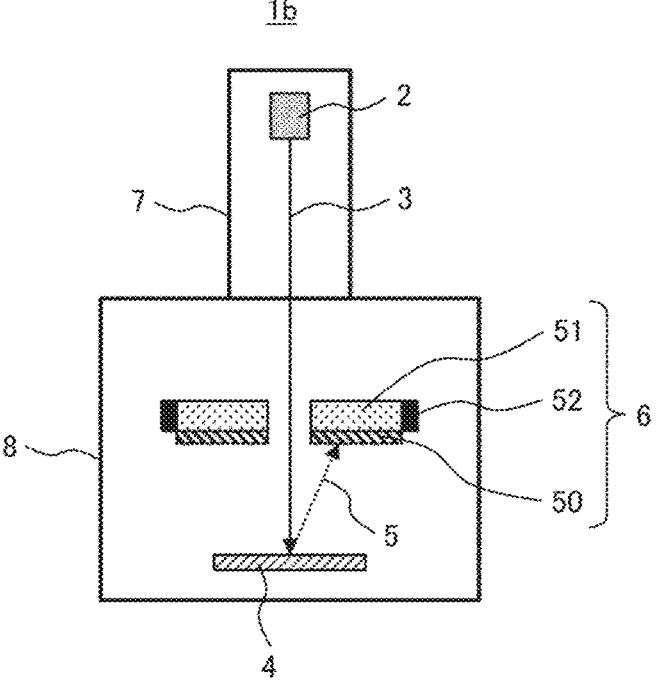
FIG. 2 is a schematic sectional view illustrating a second example of the charged particle beam apparatus of the present invention.

FIG. 2 is a schematic sectional view illustrating a second example of the charged particle beam apparatus of the present invention. In the charged particle beam apparatus (electron microscope) 1b illustrated in FIG. 2, by arranging the scintillator 50 of the secondary particle detector 6 immediately above the sample 4, the secondary particles 5 emitted from the sample 4 can be made incident on the scintillator 50 without applying a post voltage. In addition, the scintillator 50 can detect the secondary particles 5 emitted in a wide angular range by enlarging the surface on which the secondary particles 5 are incident. Therefore, even a backscattered electron (BSE) having a smaller amount than the secondary electron (SE) as the secondary particle 5 can be detected with high efficiency, and image observation and measurement with high accuracy can be performed.

In common with the charged particle beam apparatus 1a of FIG. 1 and the charged particle beam apparatus 1b of FIG. 2, the scintillator 50 and the light guide 51 can have various shapes as long as the scintillator does not block the trajectory of the primary electron beam 3. For example, it is conceivable to adopt an annular shape centered on the primary electron beam 3. The scintillator 50 may have a shape covering the entire surface of the light guide 51 or a shape covering a part thereof. Alternatively, the scintillator 50 may be disposed at a position along an inner wall or a component of the charged particle beam apparatus. In addition, the number of the photodetectors 52 may be one or more, and may be placed at any position as long as the luminescence of the scintillator 50 can be input. In FIG. 1, the photodetector 52 is disposed outside the sample chamber 8, but may be disposed in the sample chamber 8.

As the photodetector 52, a photomultiplier tube, a photodetector using a semiconductor, or the like can be used. In addition, the light guide 51 is used for inputting light from the scintillator 50 to the photodetector 52 in FIGS. 1 and 2, but light may be input by another method or another arrangement.

The signal obtained by the photodetector 52 is converted into an image and displayed in association with the electron beam irradiation position. An electron optical system for focusing and irradiating the sample 4 with the primary electron beam 3, that is, a deflector, a lens, an aperture, an objective lens, and the like are not illustrated. The electron optical system is installed in the electron optical lens barrel 7. The sample 4 is in a movable state by being placed on a sample stage (not illustrated), and the sample 4 and the sample stage are arranged in the sample chamber 8. The sample chamber 8 is generally kept in a vacuum state. Although not illustrated, the electron microscope is connected with a control unit that controls the operation of the whole and each component, a display unit that displays an image, an input unit that a user inputs an operation instruction of the electron microscope, and the like.

This electron microscope is one example of the configuration, and the charged particle beam apparatus of the present invention can be applied to other configurations as long as it is an electron microscope including the scintillator of the present invention described later. The secondary particles 5 also include transmitted electrons, scanning transmitted electrons, and the like. In addition, although only one secondary particle detector 6 is illustrated in FIGS. 1 and 2 for simplicity, a detector for backscattered electron (BSE) and a detector for secondary electron (SE) or the like may be separately provided, or a plurality of detectors may be provided for discriminating and detecting an azimuth angle or an elevation angle.

[Scintillator]

Figure 3:
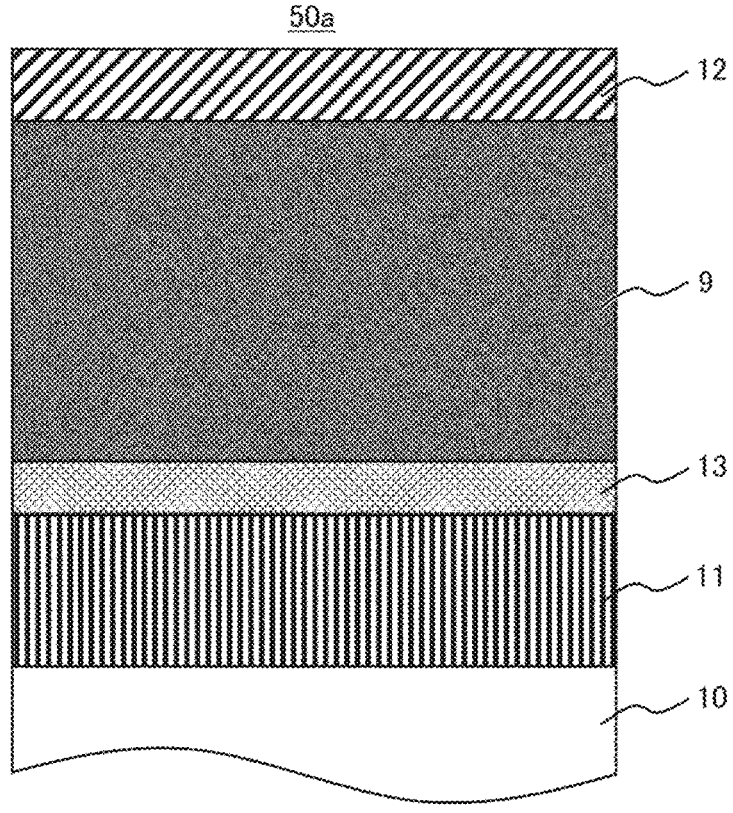
FIG. 3 is a schematic sectional view illustrating a first example of a scintillator for the charged particle beam apparatus of the present invention.

Next, the scintillator 50 of the present invention will be described. FIG. 3 is a schematic sectional view illustrating a first example of the scintillator of the present invention. As illustrated in FIG. 3, a scintillator 50a has a configuration in which a substrate 10, a buffer layer 11, a luminescent unit 9, and a first conductive layer 12 are stacked in this order. The first conductive layer 12 is formed on a side on which charged particles to be detected are incident in the charged particle beam apparatus. In addition, the second conductive layer 13 is provided between the substrate 10 and the luminescent unit 9. In other words, the second conductive layer 13 is provided on the substrate 10 side from the luminescent unit 9.

As a material of each layer constituting the scintillator 50a, for example, the substrate 10 may contain sapphire, the buffer layer 11 and the scintillator luminescent unit 9 may contain one or more elements selected from the group consisting of Ga (gallium), Zn (zinc), In (indium), Al (aluminum), Cd (cadmium), Mg (magnesium), Ca (calcium), and Sr (strontium), the first conductive layer 12 may contain one or more elements selected from the group consisting of Al, Zn, and Ag (silver), and the second conductive layer 13 may contain Zn. The buffer layer 11, the luminescent unit 9, the first conductive layer 12, and the second conductive layer 13 can be formed by chemical vapor deposition (CVD).

By removing carriers remaining in the scintillator luminescent unit 9 from the second conductive layer 13, slow luminescence (afterglow) due to the residual carriers can be reduced. The second conductive layer 13 is provided at the interface between the buffer layer 11 and the luminescent unit 9 in FIG. 3, but may be provided at the interface between the substrate 10 and the buffer layer 11 or the like. If it is closer to the substrate 10 than the luminescent unit 9, the residual carrier can be removed.

The substrate 10 has, for example, a disk shape of ½ to 4 inches φ, and a material obtained by growing the buffer layer 11, the second conductive layer 13, and the luminescent unit 9, forming the first conductive layer, and then cutting the first conductive layer 12 into a predetermined size can be used as a scintillator. The interface between the substrate 10 and the buffer layer 11 or the second conductive layer 13 may have a flat surface or an uneven structure. For example, when a structure in which a protruding structure having a structure pitch of 10 to 10,000 nm and a structure height of 10 to 10,000 nm is continuously formed when the cross-section is viewed is used, the probability that the luminescence in the scintillator luminescent unit 9 can be taken out to the substrate 10 side increases, and the luminescence output can be improved.

The thickness of the buffer layer 11 is preferably 1 μm or more and 10 μm or less. If the buffer layer 11 is thinner than 1 μm, there is a possibility that distortion occurs in the scintillator luminescent unit 9 and afterglow increases. In addition, when the buffer layer 11 is thicker than 10 μm, emitted light is absorbed in the buffer layer 11, and there is a possibility that the amount of light extraction from the scintillator decreases.

The thickness of the scintillator luminescent unit 9 is preferably 200 nm or more and 10 μm or less. When the scintillator luminescent unit 9 is thinner than 200 nm, the number of generated carriers is small, so that the luminescence intensity decreases. In addition, when the scintillator luminescent unit 9 is thicker than 10 μm, even if light is emitted, the light is absorbed in the scintillator luminescent unit 9 before reaching the buffer layer 11 side, and there is a possibility that the amount of light extraction from the scintillator decreases.

The thickness of the first conductive layer 12 is preferably 40 nm or more and 500 nm or less. If the first conductive layer 12 is thinner than 40 nm, there is a possibility of charging when the secondary particles 5 are incident. In addition, if the first conductive layer 12 is thicker than 500 nm, energy is lost when the secondary particles 5 pass through the first conductive layer 12, and there is a possibility that the amount of charged particle beams incident on the scintillator luminescent unit 9 decreases. As the material of the first conductive layer 12, other materials, alloys, and the like can be used in addition to Al, Zn, and Ag as long as it is a conductive material.

The thickness of the second conductive layer 13 is preferably 10 nm or more. If the second conductive layer 13 is thinner than 10 nm, a portion where the second conductive layer 13 is not formed can be formed, and the portion may be charged. The material of the second conductive layer 13 preferably contains Zn, but other materials, alloys, and the like can be used in addition to Zn as long as the material has conductivity and can transmit generated light.

Figure 4:
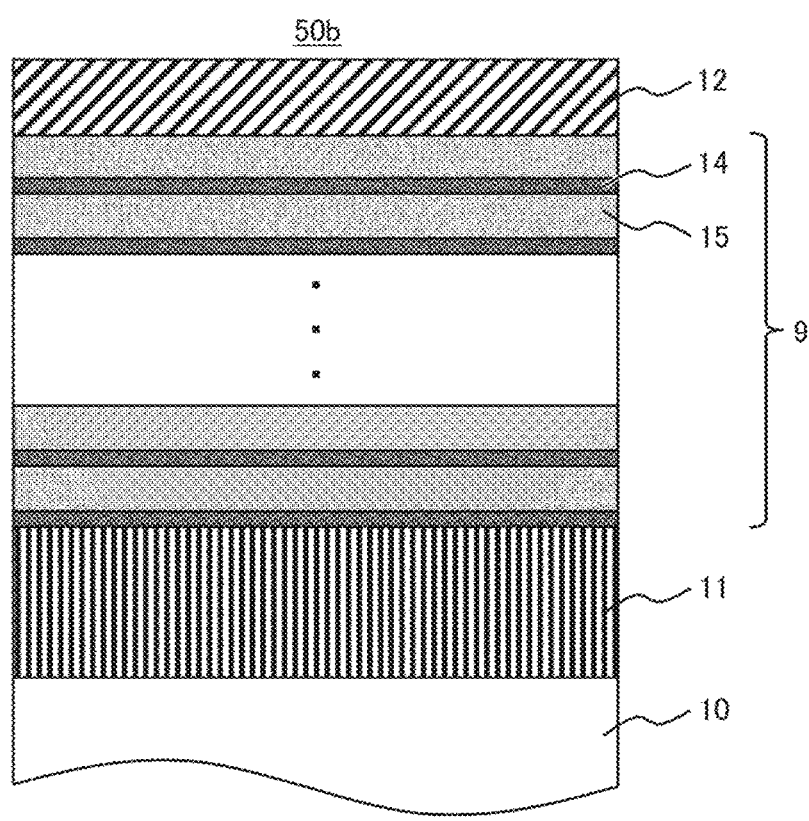
FIG. 4 is a schematic sectional view illustrating a second example of the scintillator for the charged particle beam apparatus of the present invention.

FIG. 4 is a schematic sectional view illustrating a second example of the scintillator of the present invention. The scintillator 50b illustrated in FIG. 4 is different from the scintillator 50a illustrated in FIG. 3 in that the luminescent unit 9 includes a laminate of a luminescent layer 14 and a barrier layer 15. Although not illustrated, a second conductive layer is provided between the luminescent unit 9 and the substrate 10 as in FIG. 3.

The material of each layer constituting the scintillator 50b can be, for example, a material in which the substrate 10 contains sapphire, the buffer layer 11, the luminescent layer 14, and the barrier layer 15 contain one or more elements selected from the group consisting of Zn, Cd, Mg, Ca, and Sr, and the first conductive layer 12 contains one or more elements selected from the group consisting of Al, Zn, and Ag, similarly to the scintillator 50a of FIG. 3 described above. The buffer layer 11, the luminescent layer 14, and the barrier layer 15 can be formed by a chemical vapor deposition (CVD). The scintillator luminescent unit 9 made of a laminate made of the above-described material has multi quantum wells (MQW) and can obtain high luminescence intensity.

The shapes and thicknesses of the substrate 10, the buffer layer 11, the scintillator luminescent unit 9, and the first conductive layer are the same as those in FIG. 3 described above.

The band gap energy ($E_g$) of the luminescent layer 14 is preferably smaller than that of the barrier layer 15. When the $E_g$ of the luminescent layer 14 is smaller than that of the barrier layer, carriers easily gather in the luminescent layer 14, and the luminescence probability due to carrier recombination is improved.

Specifically, the relationship between the thickness a of a luminescent layer 14 and a thickness b of the barrier layer 15 is preferably b/a=5 or more and 50 or less. When b/a is smaller than 5, the shift of the lattice constant generated in the luminescent layer 14 cannot be suppressed in the barrier layer 15, distortion occurs, and afterglow may increase. In addition, when b/a is larger than 50, the probability that carriers moving in the barrier layer 15 reach the luminescent layer 14 decreases, and the luminescence intensity may decrease. In addition, b/a is preferably 11 or more and 25 or less in order to further exhibit the effects of improving the luminescence intensity and decreasing the afterglow intensity.

The thickness b of the barrier layer 15 is preferably 10 nm or more and 100 nm or less. If the thickness b is smaller than 10 nm, distortion may occur in the laminate of the scintillator luminescent unit 9, leading to a decrease in the luminescence intensity and an increase in the afterglow intensity. In addition, when the thickness b is larger than 100 nm, the probability that carriers moving in the barrier layer 15 reach the luminescent layer 14 decreases, and the luminescence intensity may decrease.

It is preferable that a plurality of luminescent layers 14 and a plurality of barrier layers 15 are alternately stacked. When the barrier layer 15 is thick, the number of generated carriers increases, but when the barrier layer is too thick, the arrival probability of carriers to the luminescent layer 14 decreases, and the luminescence intensity may decrease. At this time, by alternately stacking a plurality of the luminescent layers 14 and the barrier layers 15, the total thickness of the barrier layers 15 included in the laminate of the scintillator luminescent unit 9 can be increased while maintaining the thickness of each barrier layer 15, so that it is possible to achieve both an increase in the number of carriers and an improvement in the probability of carriers reaching the luminescent layer 14.

The number of each of the luminescent layers 14 and the barrier layers 15 is preferably 5 or more and 25 or less. When the number of layers is less than five, the laminate of the scintillator luminescent unit 9 cannot be thickened, and there is a possibility that the luminescence intensity decreases. In addition, when the number of layers is more than 25, distortion may occur by stacking a large number of layers having different lattice constants, leading to a decrease in luminescence intensity and an increase in the afterglow intensity. Furthermore, since the laminate becomes thick, there is a possibility that light is absorbed in the laminate and the amount of light extraction decreases.

Figure 5:
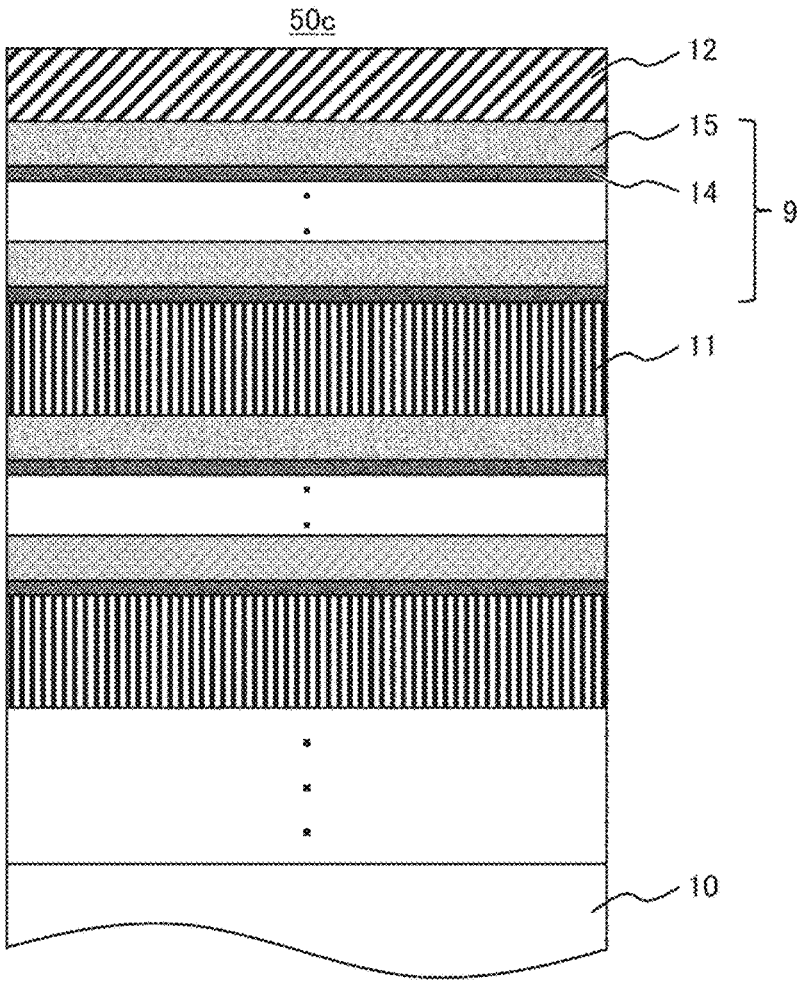
FIG. 5 is a schematic sectional view illustrating a third example of the scintillator for the charged particle beam apparatus of the present invention.

FIG. 5 is a schematic sectional view illustrating a third example of the scintillator of the present invention. A scintillator 50c illustrated in FIG. 5 has a configuration in which a combination of the luminescent unit 9 and the buffer layer 11 of the scintillators 50a and 50b illustrated in FIG. 3 or 4 is repeatedly stacked. In FIG. 5, the luminescent unit 9 is a laminate of the luminescent layer 14 and the barrier layer 15, but may be a single-layer luminescent unit 9 as illustrated in FIG. 3. Although not illustrated, a second conductive layer is provided between the luminescent unit 9 and the substrate 10 as in FIG. 3.

The thicknesses of the luminescent unit 9 and the buffer layer 11 from the uppermost portion to the lowermost portion are preferably 200 nm or more and 10 μm or less. When the luminescent unit 9 and the buffer layer 11 are thinner than 200 nm, the number of generated carriers is small, so that the luminescence intensity decreases. In addition, when the luminescent unit 9 and the buffer layer 11 are thicker than 10 μm, emitted light is absorbed in the luminescent unit 9 or the buffer layer 11, and there is a possibility that the amount of light extraction from the scintillator decreases.

When the voltage of the secondary particles 5 is high, the penetration distance into the scintillator 50 increases. Therefore, in order to increase the excitation amount of carriers by the secondary particles 5, it is necessary to make the scintillator luminescent unit 9 thick according to the penetration distance of the secondary particles 5. At this time, when only the scintillator luminescent unit 9 is thickly stacked, particularly in the case of a laminate of the luminescent layer 14 and the barrier layer 15 illustrated in FIG. 4, distortion of the structure may increase, and the afterglow is considered to increase. On the other hand, in a case where the scintillator luminescent unit 9 and the buffer layer 11 are repeatedly stacked, since the distortion is reduced by the lamination of the buffer layer 11, the luminescence intensity can be increased without increasing the afterglow.

The layer thickness and the number of layers of the buffer layer 11, the scintillator luminescent unit 9, the luminescent layer 14, the barrier layer 15, the first conductive layer 12, and the second conductive layer 13 illustrated in FIGS. 3 to 5 can be measured by using a transmission electron microscope (TEM), an X-ray, or the like.

In particular, a material containing zinc oxide (ZnO) is preferably used as the luminescent unit 9. When ZnO is contained, attenuation of luminescence is fast, so that both reduction of the afterglow and increase of the luminescence intensity can be achieved at a high level. In addition, when the luminescent unit 9 containing ZnO has multi quantum wells, $E_g$ can be increased by adding Cd, and $E_g$ can be decreased by adding Mg.

The scintillator preferably has a luminescence wavelength of 450 nm or less. In particular, in ZnO, the luminescence wavelength is 380 nm when there is no additive, whereas the luminescence wavelength is lengthened by adding Mg or the like, but when the luminescence wavelength is more than 450 nm, the structure changes due to an increase in the amount of addition, distortion may occur, and the afterglow may increase.

In the case of an LED (light emitting diode), carriers are recombined at a pn junction portion between a p-type semiconductor and an n-type semiconductor by current injection, and light is emitted. On the other hand, in the scintillator illustrated in FIGS. 3 to 5, excitation of carriers by charged particles incident in the n-type structure and luminescence by recombination occur. Therefore, since the light can be emitted without pn junction, it is not necessary to form a p-type structure. The scintillator and the LED of the present invention are different in this respect.

In the scintillator described above, light can be propagated not only in the up-down direction (direction from the first conductive layer 12 toward the substrate 10) in the scintillator but also in the left-right direction. Therefore, even in a case where light is guided by the light guide 51 to the photodetector 52 having a surface provided at an angle of 90 degrees with respect to the incident surface of the scintillator 50 having a large incident surface of the secondary particle 5 from the sample 4 as illustrated in FIG. 2, the light propagates inside the scintillator 50, so that the detection efficiency of the light in the photodetector 52 can be improved.

Figure 6:
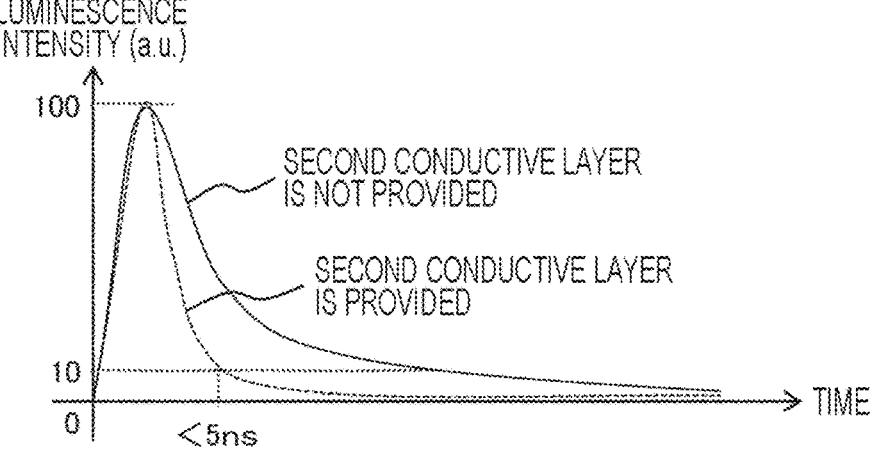
FIG. 6 is a graph illustrating a relationship between presence or absence of a second conductive layer of the scintillator and afterglow.

FIG. 6 is a graph illustrating a relationship between presence or absence of a second conductive layer 13 of the scintillator and afterglow. The scintillator had the configuration illustrated in FIG. 3, and a substrate 10 (2 inch φ sapphire substrate), a buffer layer 11 (1 μm ZnO layer), a luminescent unit 9 (1 μm ZnO:Ga), and a first conductive layer 12 (80 nm Al) were stacked. A sample with the second conductive layer 13 (10 nm ZnO) and a sample without the second conductive layer 13 were prepared. The buffer layer 11, the luminescent unit 9, and the second conductive layer 13 were formed by CVD.

FIG. 6 illustrates a temporal change in the luminescence intensity, which is a waveform when the scintillator is connected to the oscilloscope. The applied voltage was 10 kV. In a case where the second conductive layer 13 is not provided (solid line graph in FIG. 6), it can be seen that the inclination of the falling of the luminescence is small and the afterglow is large. On the other hand, in a case where the second conductive layer 13 is provided (dashed line graph in FIG. 6), it can be seen that the inclination of the falling of the luminescence is large and the afterglow is small. By including the second conductive layer 13, the time from the rise of luminescence to the attenuation of luminescence to 10% of the maximum intensity can be made shorter than 5 ns.

Note that it has been separately confirmed that the afterglow can be reduced even when the luminescent unit 9 is the multi quantum wells of FIG. 4 and the scintillator in which the luminescent unit 9 and the buffer layer 11 of FIG. 5 are stacked, similarly to FIG. 6 described above.

Figure 7:
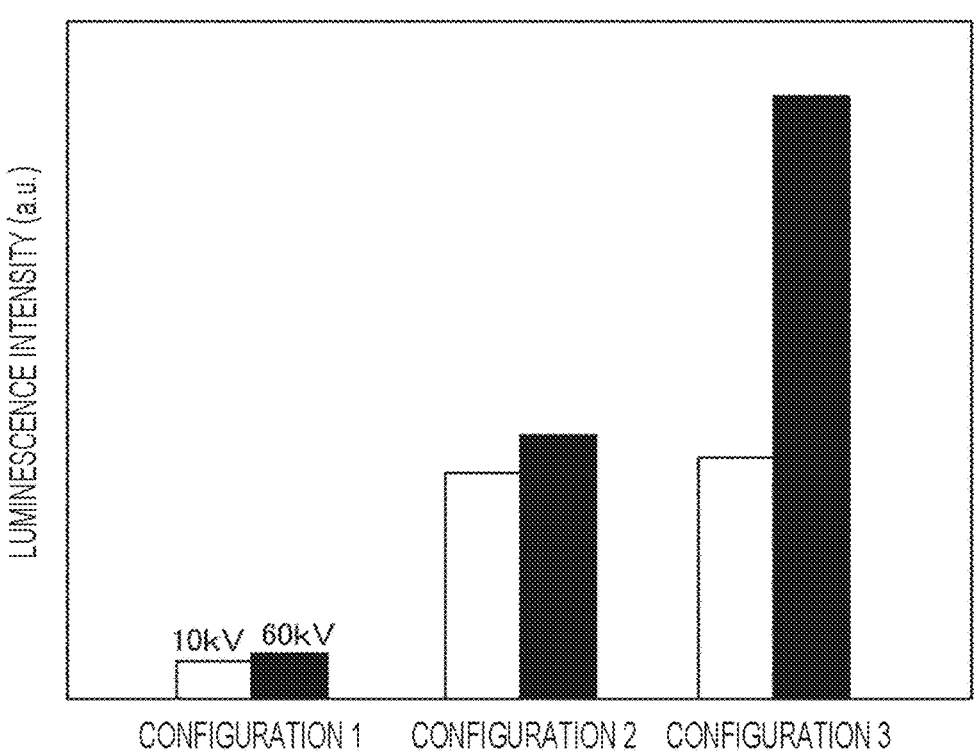
FIG. 7 is a graph illustrating a relationship between a structure of a luminescent unit and luminescence intensity.

FIG. 7 is a graph illustrating a relationship between a structure of the luminescent unit and the luminescence intensity. In FIG. 7, configuration 1: a case where the scintillator luminescent unit 9 is a single layer having a thickness of 1 μm, configuration 2: a case where one set of the scintillator luminescent unit 9 having multi quantum wells and the buffer layer 11 is stacked to form the luminescent unit 9 having a thickness of 1 μm, and configuration 3: a case where five sets of the scintillator luminescent unit 9 having multi quantum wells and the buffer layer 11 are stacked to form the scintillator luminescent unit 9 having a thickness of 10 μm from the uppermost portion to the lowermost portion of the luminescent unit 9. The scintillators of the configurations 1 to 3 are mounted on an electron microscope, and image brightness (luminescence intensity) at 10 kV and 60 kV is shown. From the comparison between the configuration 1 and the configuration 2, it can be seen that the luminescence intensity increases by adopting the multi quantum wells as compared with the case where the scintillator luminescent unit 9 is a single layer. In addition, from the comparison between the configurations 1 and 2 and the configuration 3, it is found that the luminescence intensity increases particularly at a high voltage of 60 kV by increasing the thickness of the scintillator luminescent unit 9.

In the above description, an example in which the scintillator is mainly applied to a detector such as a scanning electron microscope (SEM) has been described, but the scintillator for a charged particle beam apparatus of the present invention may be adopted as a detector of a mass spectrometer.

Figure 8:
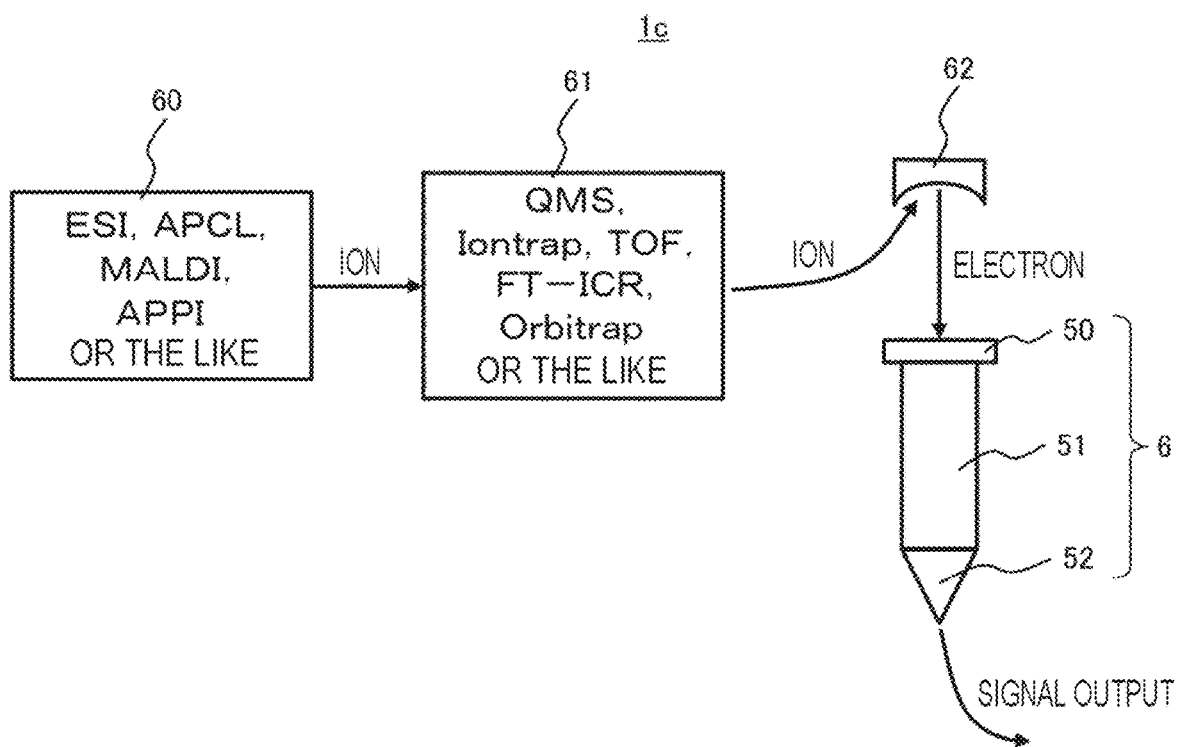
FIG. 8 is a schematic sectional view illustrating a third example of the charged particle beam apparatus of the present invention.

The mass spectrometer performs mass separation of ions by electromagnetic action, and measures a mass/charge ratio of ions to be measured. FIG. 8 is a schematic sectional view illustrating a third example of the charged particle beam apparatus of the present invention. FIG. 8 illustrates a configuration of a mass spectrometer as a charged particle beam apparatus 1c. A mass spectrometer 1c illustrated in FIG. 8 includes an ionization unit 60 that ionizes a sample to be analyzed, a mass separation unit 61 that mass-selects ions extracted in the ionization unit 60, a conversion dynode (conversion electrode) 62 that converts ions mass-selected in the mass separation unit 61 into charged particles by colliding the ions with electrodes, and a secondary particle detector 6 that detects charged particles generated in the conversion dynode 62.

Examples of a method of ionization of the ionization unit 60 include ESI (Electrospray Ionization), APCI (Atmospheric Pressure Chemical Ionization), MALDI (Matrix-Assisted Laser Desorption Ionization), and APPI (Atmospheric Pressure Photo-Ionization). Examples of the mass separation unit 61 include a quadrupole mass spectrometer (QMS) type, an ion trap type, a time-of-flight type, a FT-ICR (Fourier Transform Ion Cyclotron Resonance) type, an Orbitrap type, or a composite type thereof.

The secondary particle detector 6 has the same configuration as the secondary particle detector 6 illustrated in FIGS. 1 and 2, and includes the scintillator 50 of the present invention. By applying the scintillator 50 for a charged particle beam apparatus of the present invention, it is possible to provide the mass spectrometer 1c capable of performing high-speed and high-sensitivity analysis.

As described above, according to the present invention, it has been shown that it is possible to provide a scintillator for a charged particle beam apparatus in which the afterglow intensity is reduced and the luminescence intensity is increased.

In addition, the present invention is not limited to the above-described embodiments, and includes various modifications. For example, the above-described embodiments have been described in detail in order to describe the present invention in an easy-to-understand manner, and are not necessarily limited to those having all the described configurations. Further, a part of the configuration of one embodiment can be replaced with the configuration of another embodiment, and the configuration of another embodiment can be added to the configuration of one embodiment. Furthermore, it is possible to add, delete, and replace other configurations for a part of the configuration of each embodiment.

In the embodiment of the present invention described above, the SEM and the mass spectrometer have been described as examples of the charged particle beam apparatus of the present invention, but the charged particle beam apparatus of the present invention is not limited thereto. Application to other apparatuses using an ion beam is also possible.

In addition, the present invention can be applied not only to observation but also to a semiconductor pattern measuring apparatus, an inspection apparatus, and the like as an application in the case of using SEM.

Further, the scintillator of the present invention includes: The present invention is applicable not only to the charged particle beam apparatus but also to a radiation detector that detects radiation.

REFERENCE SIGNS LIST

1a, 1b charged particle beam apparatus (electron microscope)
1c charged particle beam apparatus (mass spectrometer)
2 electron source
3 primary electron beam
4 analyte (sample)
5 secondary particle
6 secondary particle detector

7 electron optical lens barrel
8 sample chamber
9 scintillator luminescent unit
10 substrate
11 buffer layer
12 first conductive layer
13 second conductive layer
14 luminescent layer
15 barrier layer
50, 50a, 50b, 50c scintillator
51 light guide
52 photodetector
60 ionization unit
61 mass separation unit
62 conversion electrode

The invention claimed is:

1. A scintillator comprising:
a substrate;
a buffer layer stacked on the substrate;
a luminescent unit stacked above the buffer layer; and
a first conductive layer stacked on the luminescent unit,
wherein the luminescent unit contains one or more elements that are selected from the group consisting of Ga, Zn, In, Al, Cd, Mg, Ca, and Sr,
wherein a second conductive layer is provided between the substrate and the luminescent unit, and
wherein the luminescent unit includes a laminate of a plurality of luminescent layers and a plurality of barrier layers that are alternately stacked.

2. The scintillator according to claim 1, wherein the luminescent layer and the barrier layer contain one or more elements selected from the group consisting of Zn, Cd, Mg, Ca, and Sr.

3. The scintillator according to claim 1, wherein the second conductive layer is provided between the buffer layer and the luminescent unit.

4. The scintillator according to claim 1, wherein the second conductive layer is provided between the substrate and the buffer layer.

5. The scintillator according to claim 1, wherein a film thickness of the second conductive layer is 10 nm or more.

6. The scintillator according to claim 1, wherein a plurality of the luminescent units and a plurality of the buffer layers are stacked.

7. The scintillator according to claim 2, wherein a band gap energy of the luminescent layer is smaller than that of the barrier layer.

8. The scintillator according to claim 1, wherein a peak of a luminescence wavelength from the luminescent unit is 450 nm or less.

9. The scintillator according to claim 1, wherein a surface of the substrate has an uneven structure.

10. The scintillator according to claim 1, wherein the first conductive layer contains one or more elements selected from the group consisting of Al, Zn, and Ag.

11. The scintillator according to claim 1, wherein the second conductive layer contains Zn.

12. The scintillator according to claim 1, wherein the luminescent unit contains ZnO.

13. A charged particle beam apparatus comprising:
an electron source that irradiates an analyte with an electron beam; and
a secondary particle detector that detects secondary particles emitted when the analyte is irradiated with the electron beam,
wherein the secondary particle detector includes the scintillator according to claim 1.

14. The charged particle beam apparatus according to claim 13, wherein the scintillator is provided immediately above the analyte from which the secondary particles are emitted.

15. The charged particle beam apparatus according to claim 14, wherein the charged particle beam apparatus is an electron microscope device or a mass spectrometer.

* * * * *